Patented Aug. 28, 1923.

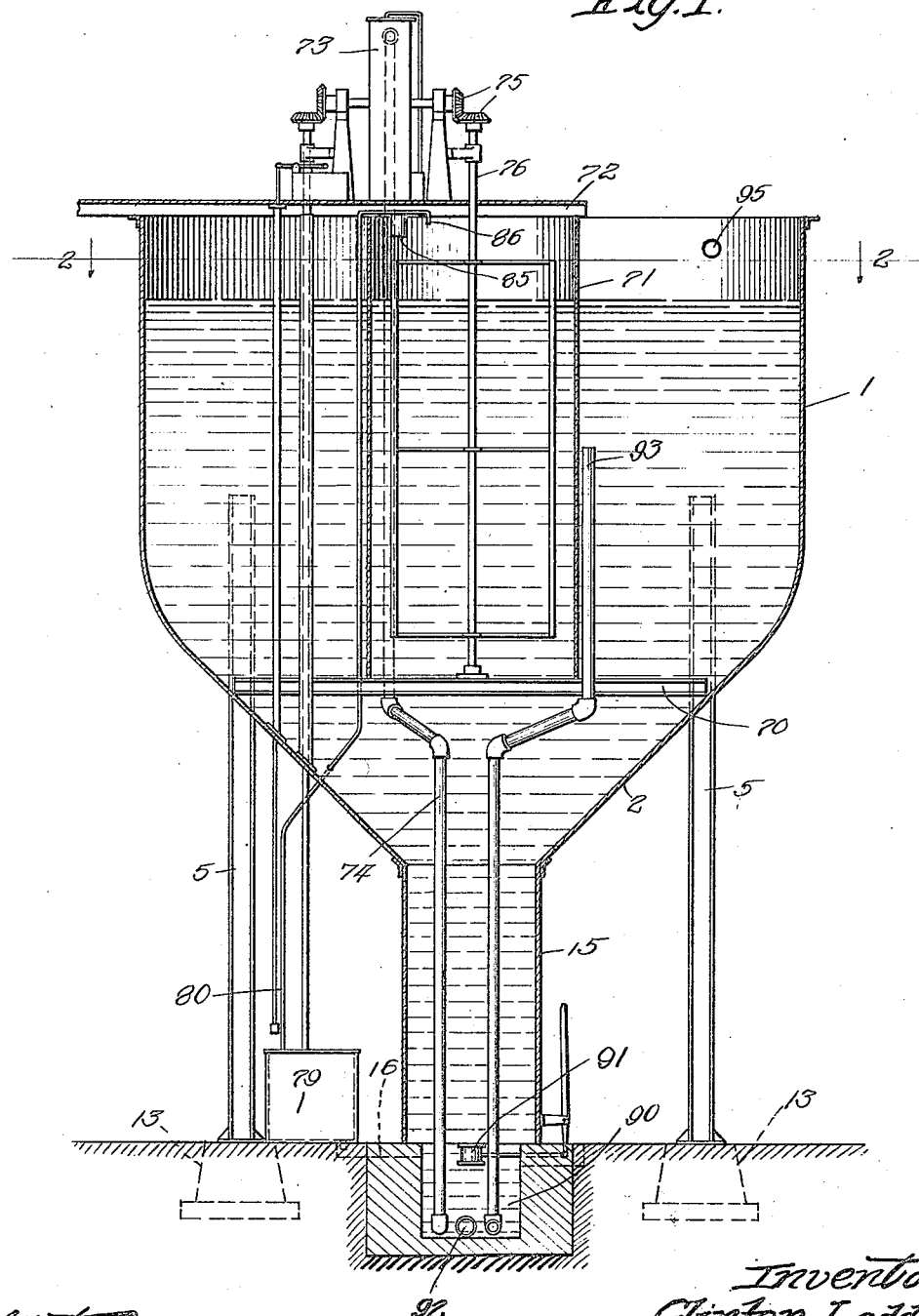

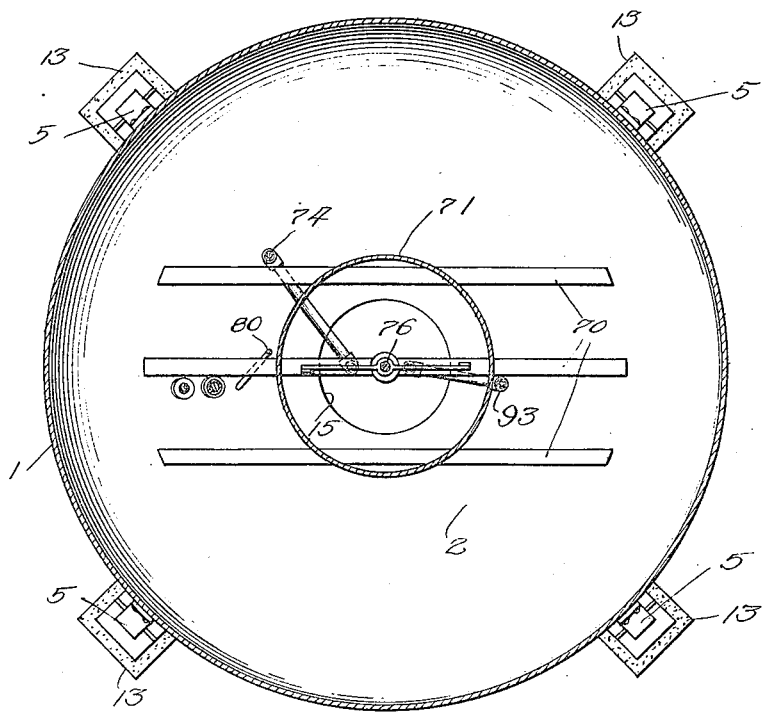

1,466,053

UNITED STATES PATENT OFFICE.

CLINTON LADD, OF CHICAGO, AND THOMAS G. WINDES, JR., OF WINNETKA, ILLINOIS, ASSIGNORS TO CHICAGO BRIDGE & IRON COMPANY, A CORPORATION OF ILLINOIS.

COMBINED WATER SOFTENER AND STORAGE TANK.

Application filed August 7, 1920. Serial No. 401,929.

*To all whom it may concern:*

Be it known that we, CLINTON LADD and THOMAS G. WINDES, Jr., citizens of the United States, residing at Chicago and Winnetka, respectively, in the county of Cook and State of Illinois, have invented a new and useful Improvement in Combined Water Softeners and Storage Tanks, of which the following is a specification.

This invention relates to improvements in a combined water softener and storage tank.

One of the objects of the invention is to provide a single device adapted for softening water and also for storing a quantity of the softened water.

Since the softening process requires some time, it has been found desirable, in most cases, where the demand is not constant, but at times more rapid than the supply, to use a storage basin in connection with the softening mechanism, so that the softening process can be carried on continuously, and the softened water stored in such storage basin where it will be available for intermittent demand. Heretofore, in most cases, such storage basins have not been formed integrally with the softening device, but separate tanks or basins have been provided. Where an attempt was made to combine the two, difficulties were encountered owing to the fact that the sediment or sludge produced as a result of the softening process found its way into the stored water rendering it unfit for use; or else, because of the stored water, the softening mechanism would not properly work.

In our improved device we have combined the softening mechanism with a storage tank in such a way that the softening process can be carried out successfully, without contamination of the stored softened water from the sediment or sludge.

Other features of our invention are the means for removing the sludge and sediment formed by the softening process, the means for utilizing all of the space of the tank; and the provision of a tank that can be easily and simply built, the interior of which can be economically used for the softening process and the storage of water without waste of space.

The foregoing features of our invention and others will appear more fully as we proceed with our specification. In that form of device embodying the features of our invention shown in the accompanying drawings, Fig. 1 is a vertical sectional view of the complete device. Fig. 2 is a horizontal sectional view on the line 2—2 of Fig. 1, looking in the direction indicated by the arrows.

As shown in said drawings, 1 indicates the body of a tank which is cylindrical in form and preferably constructed of sheet metal in the form of large rectangular plates, cylindrically curved and riveted at their meeting margins in the manner heretofore employed in constructing similar tanks. The bottom portion 2 which is more particularly described hereinafter, is similarly formed of curved plates. Supporting legs or columns 5 have their upper ends riveted to the sides of the tank. The lower ends of the supporting legs rest upon stone or cement blocks 13. A large central settling basin 15, cylindrical in form, extends from the central portion of the bottom 2 to a suitable base or support 16 which may be formed of cement or concrete. Said settling basin is also constructed of curved plates being circular in cross-section. The enlarged diameter of the settling basin 15 places a large proportion of the weight of the tank and its contents upon the base or support 16, removing it from the supports 5 whereby the latter can be made considerably smaller than would otherwise be practicable.

The upper portion of the bottom part 2 is substantially ellipsoidal in shape, but the curve of such ellipsoid, instead of continuing thence downward and meeting the settling basin in the center thereof, is continued in a direction more steeply inclined to the horizontal, being as here shown, modified into the form of a cone; whereby the portions of said bottom adjacent to the central opening are comparatively steep and will not allow sludge or sediment to accumulate upon them.

Within the tank there are provided three horizontal channel irons or beams 70 with their ends resting on the sides of the bottom 2 as shown. Supported on the beams 70 is a smaller cylindrical tank 71 open at the top and the bottom, within which is contained a rotatable agitator 72 of any ordinary form such as is commonly used in water softening devices. Any desirable means are provided for operating the agitator 72. As here shown such means comprise an overshot water-wheel 73 adapted to be operated by inflowing water through the supply pipe 74, connected by bevel gears 75 to the vertical shaft 76 upon which the agitator is fastened. Any means is provided for introducing the desired or necessary chemicals into the stream of inflowing water in order to soften the same. As here shown, such chemicals are introduced from the chemical tank 79 through the pipe 80. The inflowing water, after it leaves the water-wheel 73, enters the cylinder 71 through the opening 85. The chemical from the outlet of the pipe 80 at 86 mixes with the inflowing water from the opening 85 as it goes into the cylinder 71. The softening process takes place in the cylinder 71, where the agitator causes a thorough mixing of the chemical and water. The particular means of mixing the chemical with the water, and the features of the softening process itself form no part of the present invention since such means are old in the art and may be performed in a variety of ways.

The sediment or sludge produced by the softening of the water within the cylinder 71 falls out of the bottom of the cylinder 71 and settles into the settling basin 15 and thence into the pit 90 through the valve 91, from which it escapes into the sewer 92. The steepness of the bottom 2 prevents any of the sludge or sediment from settling thereon.

The softened water rises within the tank 1 outside of the cylinder 71 above the top of the outlet pipe 93 which is placed substantially half way up the height of the cylinder 71. An overflow 95 is provided near the top of the tank.

In operation of the device, the softening process is carried on at such rate that the water will stand above the top of the outlet pipe 93 and below the overflow 95. When the demand is not great the water will rise so that a quantity will be stored above the top of the pipe 93 in order to be ready to supply a faster demand when it occurs. Since the bottom of the cylinder 71 from which the sludge or sediment escapes is considerably below the top of the outlet pipe 93, no sediment or sludge will rise in the tank above such outlet. The water above the top of the outlet pipe 93 will be found always to be pure.

What we claim as new and desire to secure by Letters Patent is:

1. In a combined water-softener and storage tank, a tank with a steeply inclined bottom and an outlet substantially lower than its top to provide a storage reservoir above said outlet, an open bottom water-softening mechanism located in the tank, the bottom of said water-softening mechanism being substantially lower than the outlet of the tank and above the major portion of the steeply inclined bottom, and the top of said water-softening mechanism being substantially level with the top of said tank.

2. In a combined water-softener and storage tank, a tank proper with a steeply inclined bottom and an outlet substantially lower than its top to provide a storage reservoir above said outlet, a smaller tank with an open bottom located within the tank proper, the bottom of the smaller tank being above the major portion of the steeply inclined bottom of the tank proper and substantially lower than the outlet of the tank proper.

3. In a combined water-softener and storage tank, a tank proper with a steeply inclined bottom and an outlet substantially lower than its top to provide a storage reservoir above said outlet, a smaller tank with an open bottom located within the tank proper and having its open bottom above the major portion of the steeply inclined bottom of the tank proper and substantially lower than the outlet of said tank proper, and a water-softening mechanism located within the smaller tank.

4. In a combined water-softener and storage tank, a tank proper with a steeply inclined bottom and an outlet substantially lower than its top to provide a storage reservoir above said outlet, a smaller tank with an open bottom located within the tank proper, the top of the smaller tank being substantially level with the top of the tank proper, and the bottom of the smaller tank being above the major portion of the steeply inclined bottom of the tank proper and substantially lower than the outlet of the tank proper.

In testimony whereof we have hereunto set our hands and seals this 24th day of June, 1920.

CLINTON LADD. [L. S.]
THOMAS G. WINDES, Jr. [L. S.]